United States Patent
Minematsu et al.

(10) Patent No.: US 9,065,881 B2
(45) Date of Patent: Jun. 23, 2015

(54) IMAGE RELAY APPARATUS AND IMAGE RELAY METHOD

(75) Inventors: Mika Minematsu, Fuchu (JP);
Masataka Goto, Yokohama (JP);
Takuya Kawamura, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 543 days.

(21) Appl. No.: 13/538,165

(22) Filed: Jun. 29, 2012

(65) Prior Publication Data

US 2013/0077878 A1    Mar. 28, 2013

(30) Foreign Application Priority Data

Sep. 27, 2011    (JP) .................. 2011-210813

(51) Int. Cl.
*G06K 9/36* (2006.01)
*H04L 29/06* (2006.01)

(52) U.S. Cl.
CPC .................... *H04L 65/605* (2013.01)

(58) Field of Classification Search
USPC ................ 382/232–251; 375/240.01–240.29; 709/217
See application file for complete search history.

(56) References Cited

U.S. PATENT DOCUMENTS

| | | | | |
|---|---|---|---|---|
| 6,563,535 | B1 * | 5/2003 | Anderson | 348/231.2 |
| 6,795,208 | B1 * | 9/2004 | Tanaka | 358/1.16 |
| 7,653,251 | B2 * | 1/2010 | Dei et al. | 382/232 |
| 7,719,704 | B1 * | 5/2010 | Guata | 358/1.15 |
| 8,072,631 | B2 * | 12/2011 | Murai et al. | 358/1.15 |
| 8,179,958 | B2 * | 5/2012 | Komiya et al. | 375/240.01 |
| 8,615,721 | B2 * | 12/2013 | Hara | 715/838 |
| 8,630,501 | B1 * | 1/2014 | Fram | 382/239 |
| 8,649,623 | B2 * | 2/2014 | Date et al. | 382/238 |
| 2009/0153434 | A1 * | 6/2009 | Cheng et al. | 345/1.1 |
| 2009/0303156 | A1 * | 12/2009 | Ghosh et al. | 345/1.2 |
| 2014/0362096 | A1 * | 12/2014 | Otsuka | 345/531 |

OTHER PUBLICATIONS

Japanese First Office Action dated Jun. 24, 2014 from Japanese Patent Application No. 2011-210813, 4 pages.
Wood, et al.; "Virtual Network Computing"; IEEE Internet Computing, vol. 2, No. 1; Jan./Feb. 1998; 7 pps.

\* cited by examiner

*Primary Examiner* — Ishrat I Sherali
(74) *Attorney, Agent, or Firm* — Ohlandt, Greeley, Ruggiero and Perle, L.L.P.

(57) ABSTRACT

According to one embodiment, an image relay apparatus includes a reception unit, a determination unit and a transmission unit. The reception unit receives compressed image data from a relay source apparatus. The determination unit determines whether or not the compressed image data is processable through a first path not involving decompression of the compressed image data, based on data on a relay destination apparatus. The transmission unit transfers, to the relay destination apparatus, either the compressed image data processed through the first path or recompressed image data obtained by processing the compressed image data through a second path involving decompression, drawing, and recompression of the compressed image data.

8 Claims, 12 Drawing Sheets

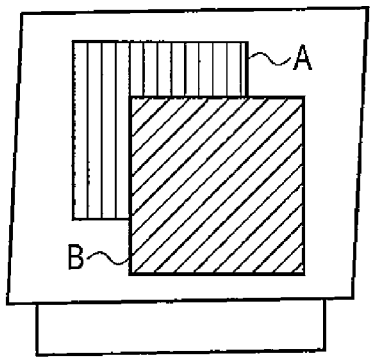
FIG. 2
```
<html>
<head>
<title></title>
</head>
<body bgcolor="#FFFFFF">
<div style="position:absolute;left:20pt;top:10pt">
<img src="PC_A.jpg">
</div>
<div style="position:absolute;left:400pt;top:200pt">
<img src="weather.jpg">
</div>
</body>
</html>
```
FIG. 5
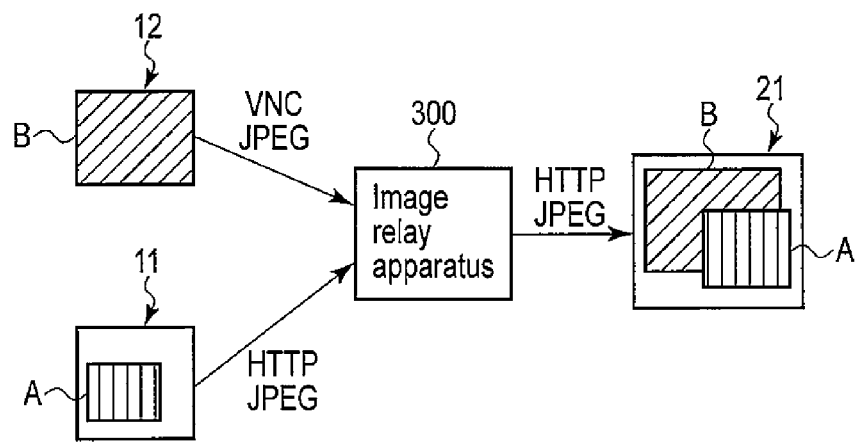
FIG. 6

IMAGE RELAY APPARATUS AND IMAGE RELAY METHOD

CROSS-REFERENCE TO RELATED APPLICATIONS

This application is based upon and claims the benefit of priority from prior Japanese Patent Application No. 2011-210813, filed Sep. 27, 2011, the entire contents of which are incorporated herein by reference.

FIELD

Embodiments described herein relate generally to image relay.

BACKGROUND

A screen transfer technique is known in which a server apparatus carries out complicated arithmetic processing to transfer image data representing a display screen of the server apparatus. According to the screen transfer technique, a client apparatus can be implemented by a display terminal with a simple I/O interface. In the screen transfer technique, typically, image data representing the entire screen is first transferred, but subsequently, instead of the image data for the entire screen, image data representing an updated area is sequentially transferred. That is, the server apparatus needs to draw image data in accordance with operation information from a display terminal, detect an updated area, compress image data representing the updated area, and transfer the compressed image data to the display terminal.

The screen transfer technique can be applied to an image relay system. In the image relay system, an image relay apparatus relays image data from at least one relay source apparatus to at least one relay destination apparatus. That is, the image relay apparatus receives compressed image data from the relay source apparatus, decompresses the compressed image data, draws the image data, detects an updated area, makes a required change (for example, a clipping process) to the image data representing the updated area, recompresses the processed image data, and transfers the recompressed image data to the relay destination apparatus.

However, the compressed image data may not need to be changed. In such a case, the recompressed image data transferred to the relay destination apparatus matches the compressed image data received from the relay source apparatus. Thus, the series of processes including the decompression, drawing, and recompression in the image relay apparatus are useless.

BRIEF DESCRIPTION OF THE DRAWINGS

FIG. 2 is a diagram illustrating image data relayed by the image relay apparatus according to the first embodiment;

FIG. 5 is a diagram illustrating a web page created by a web page creation unit in FIG. 4;

FIG. 6 is a diagram illustrating image data relayed by the image relay apparatus according to the third embodiment;

DETAILED DESCRIPTION

Embodiments will be described below with reference to the drawings.

In general, according to one embodiment, an image relay apparatus includes a reception unit, a determination unit and a transmission unit. The reception unit receives compressed image data from a relay source apparatus. The determination unit determines whether or not the compressed image data is processable through a first path not involving decompression of the compressed image data, based on data on a relay destination apparatus. The transmission unit transfers, to the relay destination apparatus, either the compressed image data processed through the first path or recompressed image data obtained by processing the compressed image data through a second path involving decompression, drawing, and recompression of the compressed image data.

In the description below, components that are identical or similar to those which have already been described are denoted by identical or similar reference numbers, and duplicate descriptions are basically omitted. Furthermore, in the description below, "image data" may refer to the entire area or a partial area of an image (for example, a screen image displayed by a relay source apparatus, one frame of a moving image, a still image, or a web image).

First Embodiment

Figure 1:
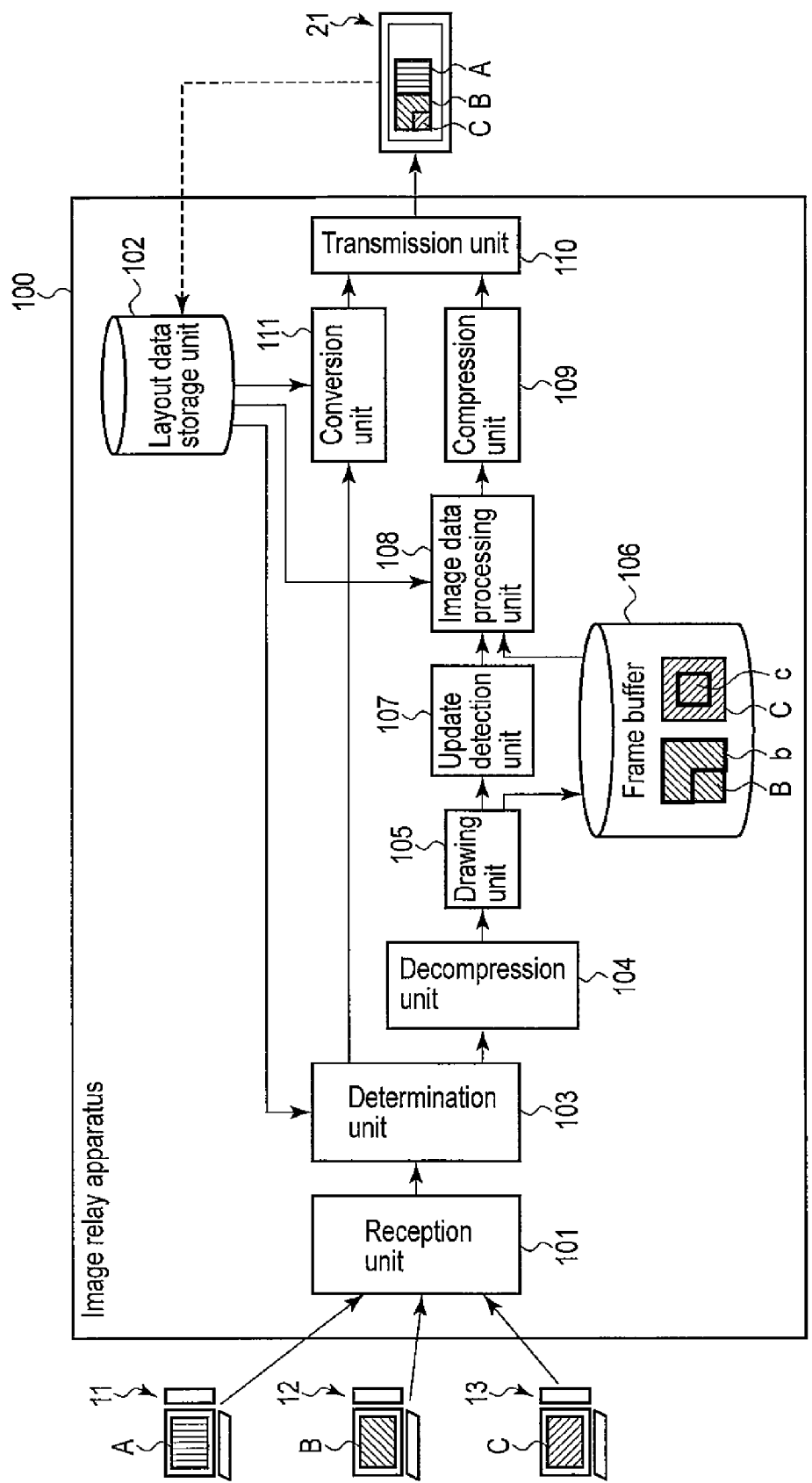
FIG. 1 is a block diagram illustrating an image relay apparatus according to a first embodiment.

FIG. 1 illustrates an image relay apparatus 100 according to a first embodiment. The image relay apparatus 100 basically receives image data from at least one relay source apparatus via a network and transfers the image data to at least one relay destination apparatus via the network.

In an example in FIG. 1, a screen transfer protocol (for example, Virtual Network Computing [VNC]) is used to receive and transfer image data. Thus, basically, the image relay apparatus 100 functions as a client apparatus for the relay source apparatus and as a server apparatus for the relay destination apparatus. The client apparatus (relay destination apparatus or image relay apparatus 100) transmits a screen update request message to the server apparatus (image relay apparatus 100 or relay source apparatus). The client apparatus can specify a desired compression scheme or the like in the screen update request message. Upon receiving the screen update request message, the server apparatus transfers image data according to specification in the screen update request message to the client apparatus. Typically, after starting screen transfer, the server apparatus transfers image data representing the entire screen to the client apparatus once, but subsequently continues to transfer image data representing an updated area to the client apparatus. Furthermore, the server apparatus may transfer image data every time the server apparatus receives the screen update request message or may automatically transfer image data after receiving the screen update request message once.

As shown in FIG. 1, the image relay apparatus 100 includes a reception unit 101, a layout data storage unit 102, a determination unit 103, a decompression unit 104, a drawing unit 105, a frame buffer 106, an update detection unit 107, an image data processing unit 108, a compression unit 109, a transmission unit 110, and a conversion unit 111. In the example illustrated in FIG. 1, the image relay apparatus 100 relays image data A in a relay source apparatus 11, image data B in a relay source apparatus 12, and image data C in a relay source apparatus 13 to a relay destination apparatus 21.

The reception unit 101 receives compressed image data from relay source apparatuses and outputs the image data to the determination unit 103. In the example illustrated in FIG. 1, the reception unit 101 receives compressed image data based on image data A from the relay source apparatus 11, compressed image data based on image data B from the relay source apparatus 12, and compressed image data based on image data C from the relay source apparatus 13.

The layout data storage unit 102 stores layout data for the relay destination apparatus. The layout data may include display position data, superimposition data, clip data, and enlargement ratio data and the like on image data to be displayed at the relay destination apparatus. The layout data may be communicated to the image relay apparatus 100 by the relay destination apparatus at the beginning of image relay or may be stored in the layout data storage unit 102 before the beginning of the image relay. Furthermore, the layout data need not necessarily be determined by the relay destination apparatus but may be determined by the image relay apparatus 100.

The display position data is stored using, for example, coordinate data. The coordinate data can be expressed by a coordinate system in which the coordinates of the uppermost and leftmost end of a screen of, for example, 1,024×768 pixels are defined to be (0, 0) and in which the coordinates of the lowermost and rightmost end of the screen are defined to be (1,023, 767). The display position data may be a combination of the coordinate data on the uppermost and leftmost end of the display position for the image data and size data on the image data. For example, if the image relay apparatus 100 relays image data A and image data B as shown in FIG. 2, for display position data on image data A, a combination of coordinate data (20, 10) with size data including a width of 800 pixels and a height of 600 pixels is stored in the layout data storage unit 102. For display position data on image data B, a combination of coordinate data (120, 110) with size data including a width of 800 pixels and a height of 600 pixels is stored in the layout data storage unit 102. Alternatively, the display position data may be a combination of the coordinate data on the uppermost and leftmost end of the display position and the coordinate data on the lowermost and rightmost end of the display position. However, the display position data is not limited to the coordinate data but may be stored in any format that enables the display position of the image data to be derived.

The superimposition data is indicative of a hierarchical relationship among a plurality of pieces of image data for display. For example, if the image relay apparatus 100 relays image data A and image data B as shown in FIG. 2, data indicating that image data B is displayed on image data A is stored in the layout data storage unit 102 as superimposition data.

The clip data is indicative of an area to be clipped for certain image data (clipped and not displayed). The area to be clipped results from, for example, a superimposition of a plurality of pieces of image data. For example, if the image relay apparatus 100 relays image data A and image data B as shown in FIG. 2, data indicative of a part of image data A which is 700 pixels in width and 500 pixels in height with respect to (100, 100) is stored in the layout data storage unit 102 as clip data. Alternatively, the clip data can be derived based on the display position data and the superimposition data and thus need not be stored in the layout data storage unit 102. If at least one piece of image data includes an area to be clipped, the image relay apparatus 100, the relay destination apparatus, or the relay source apparatus needs to carry out a clipping process on the image data.

The enlargement ratio data is indicative of an enlargement ratio for image data to be displayed on the relay destination apparatus. The enlargement ratio is calculated, for example, based on the image data displayed on the relay source apparatus. For the enlargement ratio, one value may be specified for both or each of the width and height directions. Furthermore, the enlargement ratio may be at least one or lower than one (this means reduction). If at least one of the enlargement ratios for the width and height directions is not one, the image relay apparatus 100, the relay destination apparatus, or the relay source apparatus needs to carry out an enlargement process or a reduction process on the image data.

The determination unit 103 receives compressed image data from the reception unit 101 and reads layout data from the layout data storage unit 102. The determination unit 103 determines, based on the layout data, whether or not the compressed image data can be processed through a first path not involving decompression of the compressed image data. Here, the first path refers to a processing path to the transmission unit 110 via the conversion unit 111. On the first path, the compressed image data is not changed. In contrast, a second path refers to a processing path to the transmission unit 110 via the decompression unit 104, the drawing unit 105, the frame buffer 106, the update detection unit 107, the image data processing unit 108, and the compression unit 109. On the second path, the compressed image data is changed, and the changed data is output as recompressed image data. The determination unit 103 outputs the compressed image data to the conversion unit 111 upon determining that the compressed image data can be processed through the first path. Otherwise the determination unit 103 outputs the compressed image data to the decompression unit 104.

In other words, the determination unit 103 determines whether or not the compressed image data needs to be changed, based on the layout data. If the compressed image data needs to be changed, since the compressed image data cannot be processed through the first path, the second path should be used to process the compressed image data. In contrast, if the compressed image data need not be changed, a useless processing load can be avoided by processing the compressed image data through the first path.

For example, if the image data corresponding to the compressed image data includes an area to be clipped, the determination unit 103 determines that the compressed image data cannot be processed through the first path. The determination unit 103 can check whether or not the image data includes an area to be clipped based on a combination of the display position data and superimposition data, the clip data, or the like. In the example illustrated in FIG. 2, the determination unit 103 determines that the compressed image data based on image data A cannot be processed through the first path, while determining that the compressed image data based on image data B can be processed through the first path.

Furthermore, if the image data corresponding the compressed image data is to be enlarged or reduced, the determination unit 103 determines that the compressed image data cannot be processed through the first path. The determination unit 103 can check whether or not the image data corresponding to the compressed image data is to be enlarged or reduced based on the enlargement ratio data However, such a determination is based on the assumption that the relay destination apparatus and the relay source apparatus do not carry out a clipping process, an enlargement process, or a reduction process. For example, if the relay destination apparatus or the relay source apparatus carries out a clipping process, the determination unit 103 need not determine that the compressed image data is unable to be processed through the first path only for the reason that the image data corresponding to the compressed image data includes an area to be clipped. Furthermore, if the relay destination apparatus or the relay source apparatus carries out an enlargement process or a reduction process, the determination unit 103 need not determine that the compressed image data is unable to be processed through the first path only for the reason that the image data corresponding to the compressed image data is subjected to the enlargement or reduction process. If the image relay apparatus 100 determines the layout data as described above, the relay destination apparatus may need to be notified of the layout data. In the example illustrated in FIG. 2, the image relay apparatus 100 may transmit clip data indicating that an area in image data A which is 700 pixels in width and 500 pixels in height with respect to (100, 100) is to be clipped, together with the compressed image data based on image data A. Alternatively, the image relay apparatus 100 may transmit superimposition data indicating that image data B is to be displayed on image data A.

The decompression unit 104 receives the compressed image data from the determination unit 103. The decompression unit 104 decompresses the compressed image data in accordance with the compression scheme for the compressed image data to obtain the image data. The decompression unit 104 outputs the image data to the drawing unit 105.

The drawing unit 105 receives the image data from the decompression unit 104. The drawing unit 105 draws the image data in the frame buffer 106. Moreover, the drawing unit 105 outputs data on the in-screen position of the drawn image data in the relay source apparatus to the update detection unit 107. As described above, the image data may represent the entire image (for example, the display screen of the relay source apparatus) or an updated area. That is, as illustrated in FIG. 1, in the frame buffer 106, image data b on the updated area included in image data B or image data c on the updated area included in image data C may be drawn. The position data on the updated area may be expressed in any format, but for example, a combination of pieces of position data on at least one rectangular area forming the updated area can be used. For example, the drawing unit 105 outputs, to the update detection unit 107, position data on a rectangular area that is 10 pixels in width and 10 pixels in height with respect to (0, 0) and position data on a rectangular area that is 200 pixels in width and 5 pixels in height with respect to (30, 30).

The frame buffer 106 can be implemented by any storage medium, for example, RAM (Random Access Memory), HDD (Hard Disk Drive), an optical disc, or a memory card. Image data is drawn in the frame buffer 106 by the drawing unit 105 and read from the frame buffer 106 as needed.

The update detection unit 107 receives the data on the in-screen position of the drawn image data in the relay source apparatus from the drawing unit 105 to detect the position data on the updated area based on the in-screen position data. The update detection unit 107 outputs the position data on the updated area to the image data processing unit 108. Specifically, the update detection unit 107 may handle the input position data as the position data on the updated area or may carry out a difference extraction process to detect the position data on the updated area in detail.

The difference extraction process compares the image data drawn in the frame buffer 106 by the drawing unit 105 with backup image data transferred to the relay destination apparatus to detect a changed area as an updated area. The backup image data is stored in the frame buffer 106 or a storage unit (not shown in the drawings). In either case, if the difference extraction process is carried out, the latest updated area is used to update the backup image data.

The image data processing unit 108 receives position data on the updated area from the update detection unit 107. The image data processing unit 108 reads layout data from the layout data storage unit 102. Based on the layout data and the position data on the updated area, the image data processing unit 108 identifies those image areas of the updated area which are to be displayed on the relay destination apparatus. The image data processing unit 108 then reads image data on the identified image areas from the frame buffer 106. That is, the image data processing unit 108 clips those image areas of the updated area which are not to be displayed on the relay destination apparatus.

In the example illustrated in FIG. 2, the image areas in image data A which are to be displayed on the relay destination apparatus 21 are formed of an area that is 800 pixels in width and 100 pixels in height with respect to (0, 0) and an area that is 100 pixels in width and 500 pixels in height with respect to (0, 100). Thus, if the updated area is 400 pixels in width and 400 pixels in height with respect to (0, 0), the image data processing unit 108 identifies an image area that is 400 pixels in width and 100 pixels in height with respect to (0, 0) and an image area that is 100 pixels in width and 300 pixels in height with respect to (0, 100). The image data processing unit 108 then reads image data on those image areas from the frame buffer 106.

Moreover, the image data processing unit 108 carries out an enlargement process or a reduction process on the image data read from the frame buffer 106 to obtain processed image data. The image data processing unit 108 outputs the processed image data to the compression unit 109.

The compression unit 109 compresses the processed image data to obtain recompressed image data. The compression unit 109 outputs the recompressed image data to the transmission unit 109.

The conversion unit 111 receives compressed image data from the determination unit 103. The conversion unit 111 functions as an interface that carries out a conversion process for transferring the compressed image data received from the relay source apparatus to the relay destination apparatus without decompression. Here, the conversion process may include, for example, a message conversion process, a coordinate data conversion process, a network data conversion process, and a layout data addition process. For example, the conversion unit 111 may carry out a coordinate data conversion process of associating, based on the layout data, coordinate data on the display position of the image data corresponding to the compressed image data with coordinate data on the screen of the relay destination apparatus. In the example illustrated in FIG. 2, the coordinates (0, 0) in image data B are associated with the coordinates (120, 110) on the screen of the relay destination apparatus. The conversion unit 111 outputs the compressed image data subjected to the conversion process to the transmission unit 110. Thus, the first path allows various processes on the second path (for example, decompression, drawing, image processing, and recompression) to be omitted, enabling a reduction in processing load.

The transmission unit 110 receives the recompressed image data from the compression unit 109 or the compressed image data from the conversion unit 111. The transmission unit 110 transfers the received recompressed image data or compressed image data to the relay destination apparatus. The transmission unit 110 may sequentially transfer the recompressed image data or the compressed image data every time the transmission unit 110 receives compressed image data from the relay source apparatus or may transfer the recompressed image data or the compressed image data in bulk in accordance with periodic interruptions from a timer (not shown in the drawings). Furthermore, the transmission unit 110 may or may not transfer the recompressed image data and the compressed image data at the same timing.

As described above, the image relay apparatus according to the first embodiment determines whether or not the compressed image data from the relay source apparatus needs to be changed (for example, the image data corresponding to the compressed image data needs to be subjected to a clipping process, an enlargement process, or a reduction process), based on the layout data, a type of data on the relay destination apparatus. If the compressed image data needs to be changed, the image relay apparatus uses the second path to carry out the series of processes including decompression, drawing, and recompression. Otherwise the image relay apparatus utilizes the first path to omit the series of processes. Thus, the image relay apparatus enables a reduction in processing load.

Second Embodiment

Figure 3:
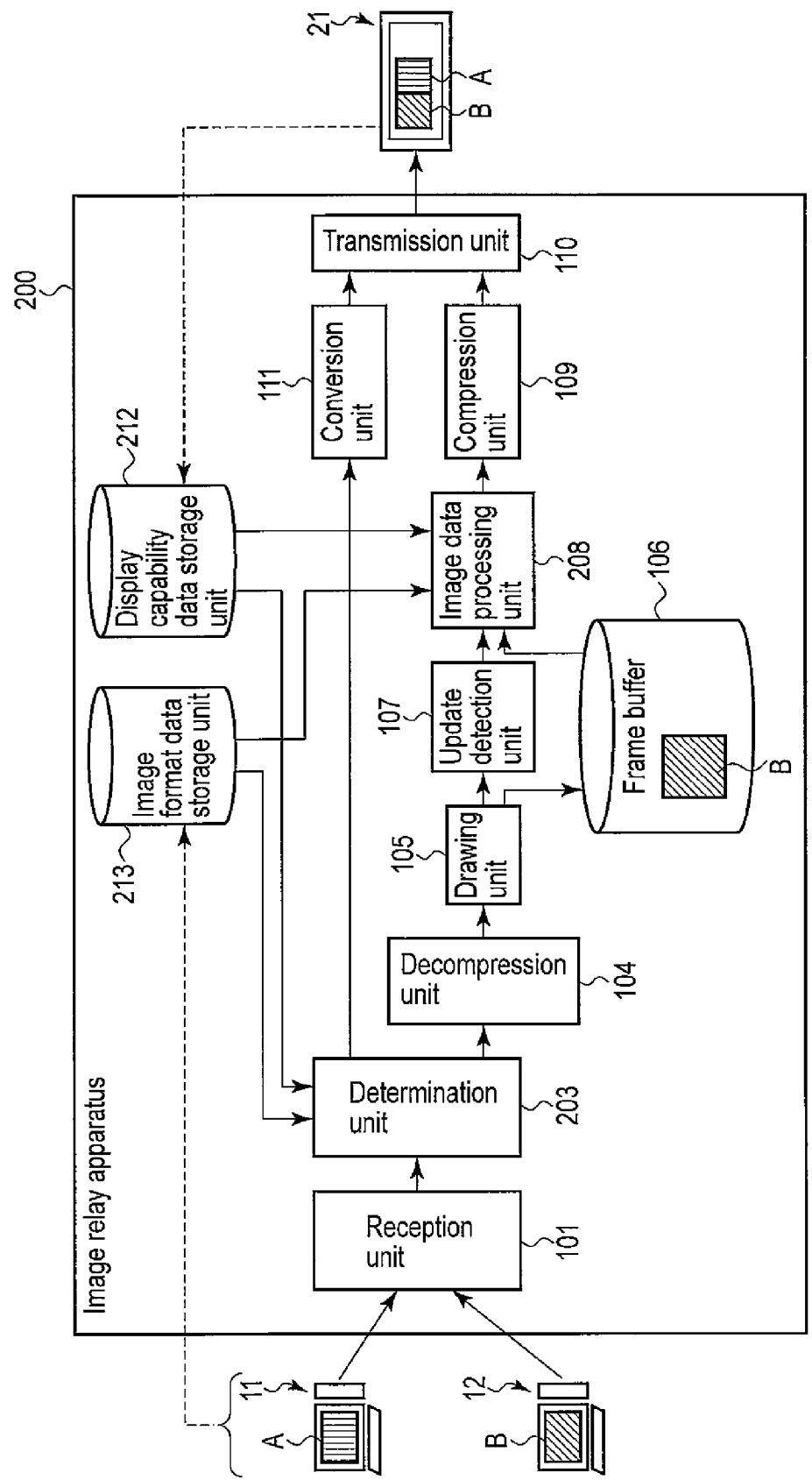
FIG. 3 is a block diagram illustrating an image relay apparatus according to a second embodiment.

As shown in FIG. 3, an image relay apparatus 200 according to a second embodiment includes a reception unit 101, a determination unit 203, a decompression unit 104, a drawing unit 105, a frame buffer 106, an update detection unit 107, an image data processing unit 208, a compression unit 109, a transmission unit 110, a compression unit 111, a display capability data storage unit 212, and am image format data storage unit 213.

The display capability data storage unit 212 stores display capability data on a relay destination apparatus. The display capability data may include first compression scheme data and first pixel format data on the relay destination apparatus. The first compression scheme data is indicative of a compression scheme (for example, zlib) in which the relay destination apparatus can decompress compressed data. The first pixel format data is indicative of a pixel format in which the relay destination apparatus can display the image data. The pixel format includes bpp, depth, and a color map. bpp is indicative of the number of bits per pixel. The depth is indicative of the number of colors that can be expressed by one pixel. The color map defines the correspondence relationship between color numbers and actual colors. The display capability data may be, for example, communicated to the image relay apparatus 200 by the relay destination apparatus at the beginning of image relay or stored in the display capability data storage unit 212 before the beginning of the image relay. Furthermore, the display capability data need not necessarily be determined by the relay destination apparatus but may be determined by the relay destination apparatus 200 based on the actual display capability of the relay destination apparatus.

The image format data storage unit 213 stores image format data on the compressed image data from the relay destination apparatus. The image format data may include second compression scheme data and second pixel format data on the compressed image data. The second compression scheme data is indicative of a compression scheme for the compressed image data. The second pixel format data is indicative of the pixel format of the image data corresponding to the compressed image data. The pixel format data may be, for example, communicated to the image relay apparatus 200 by a relay source apparatus at the beginning of image relay or stored in the image format data storage unit 213 before the beginning of the image relay or obtained by analyzing the compressed image data received after the beginning of the image relay. Furthermore, the image format data need not necessarily be determined by the relay source apparatus but may be determined by the relay destination apparatus 200.

The determination unit 203 receives compressed image data from the reception unit 101. The determination unit 203 reads the display capability data from the display capability data storage unit 212 and the image format data from the image format data storage unit 213. The determination unit 203 determines whether or not the compressed image data can be processed through a first path not involving decompression of the compressed image data, based on the display capability data and the image format data. Here, the first path refers to a processing path to the transmission unit 110 via the conversion unit 111. On the first path, the compressed image data is not changed. In contrast, a second path refers to a processing path to the transmission unit 110 via the decompression unit 104, the drawing unit 105, the frame buffer 106, the update detection unit 107, the image data processing unit 208, and the compression unit 109. On the second path, the compressed image data is changed, and the changed data is output as recompressed image data. The determination unit 203 outputs the compressed image data to the conversion unit 111 upon determining that the compressed image data can be processed through the first path. Otherwise the determination unit 203 outputs the compressed image data to the decompression unit 104.

In other words, the determination unit 203 determines whether or not the compressed image data needs to be changed, based on the display capability data and the image format data. If the compressed image data needs to be changed, since the compressed image data cannot be processed through the first path, the second path should be used to process the compressed image data. In contrast, if the compressed image data need not be changed, a useless processing load can be avoided by processing the compressed image data through the first path.

If the relay destination apparatus has no capability of decompressing the compressed image data, the determination unit 203 determines that the compressed image data cannot be processed through the first path. For example, if none of the at least one compression scheme indicated by the first compression scheme data included in the display capability data is the same as the compression scheme indicated by the second compressed image data included in the image format data, the determination unit can determine that the relay destination apparatus has no capability of decompressing the compressed image data.

Furthermore, if the relay destination apparatus has no capability of displaying the image data corresponding to the compressed image data, the determination unit 203 determines that the compressed image data cannot be processed through the first path. For example, if the bpp or depth indicated by the second pixel format data included in the image format data is larger than that indicated by the first pixel format data included in the display capability data, the determination unit 203 can determine that the relay destination apparatus has no capability of displaying the image data corresponding to the compressed image data. Furthermore, if the color map indicated by the second pixel format data included in the image format data includes a correspondence relation not defined in the color map indicated by the first pixel format data included in the display capability data, the determination unit 203 can determine that the relay destination apparatus has no capability of displaying the image data corresponding to the compressed image data.

The image data processing unit 208 receives position data on an updated area from the update detection unit 107. The image data processing unit 208 reads the display capability data from the display capability data storage unit 212 and the image format data from the image format data storage unit 213. The image data processing unit 208 reads image data on the updated area from the frame buffer 106. The image data processing unit 208 changes the pixel format or compression scheme for the image data on the updated area as needed. For example, the image data processing unit 208 changes the pixel format of the image data on the updated area based on the display capability data, and outputs the changed image data on the updated area to the compression unit 109. Alternatively, the image data processing unit 208 specifies a compression scheme for the image data on the updated area based on the display capability data, and outputs the image data on the updated area to the compression unit 109.

As described above, the image relay apparatus according to the second embodiment determines whether or not the compressed image data from the relay source apparatus needs to be changed (for example, the image format of the image data corresponding to the compressed image data or the compression scheme for the compressed image data needs to be changed), based on the display capability data, a type of data on the relay destination apparatus, and the image format data, a type of data on the relay source apparatus. If the compressed image data needs to be changed, the image relay apparatus uses the second path to carry out the series of processes including decompression, drawing, and recompression. Otherwise the image relay apparatus utilizes the first path to omit the series of processes. Thus, the image relay apparatus enables a reduction in processing load.

Third Embodiment

Figure 4:
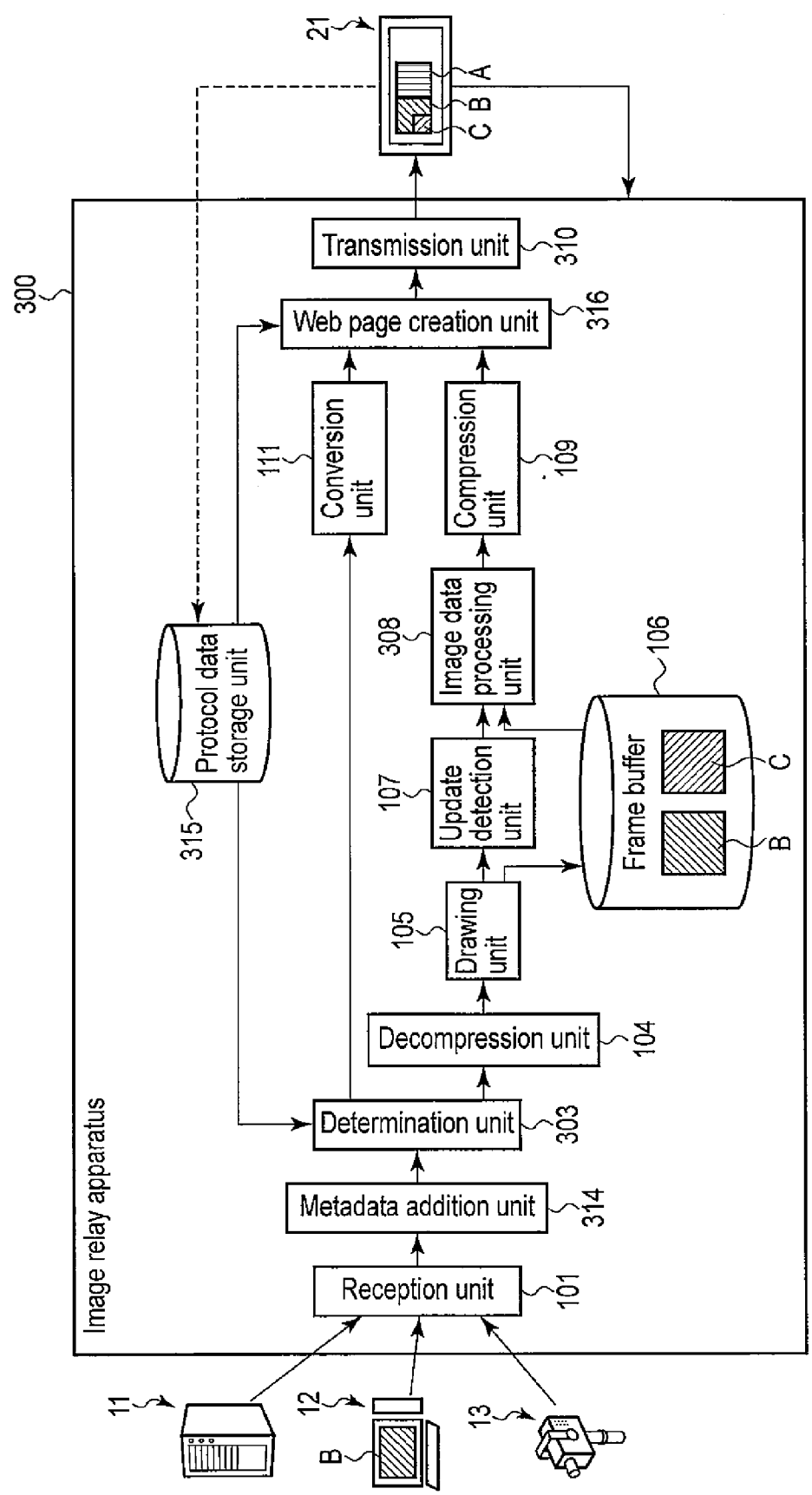
FIG. 4 is a block diagram illustrating an image relay apparatus according to a third embodiment.

As shown in FIG. 4, an image relay apparatus 300 according to a third embodiment includes a reception unit 101, a determination unit 303, a decompression unit 104, a drawing unit 105, a frame buffer 106, an update detection unit 107, an image data processing unit 308, a compression unit 109, a transmission unit 310, a compression unit 111, a metadata addition unit 314, a protocol data storage unit 315, and a web page creation unit 316.

The protocol data storage unit 315 stores protocol data. The protocol data is indicative of a first protocol (for example, Hypertext Transfer Protocol [HTTP] or VNC) involving transfer of compressed image data or recompressed image data from the image relay apparatus 300 to a relay destination apparatus. The protocol data may be, for example, communicated to the image relay apparatus 300 by a relay destination apparatus at the beginning of image relay or stored in the protocol data storage unit 315 before the beginning of the image relay. Furthermore, the protocol data need not necessarily be determined by the relay destination apparatus but the image relay apparatus 300 may select one of one or more protocols supported by the relay destination apparatus. For simplification, the first protocol is HTTP unless otherwise specified in the description below.

The metadata addition unit 314 receives compressed image data from the reception unit 101. If the first protocol is HTTP, the metadata addition unit 314 adds metadata to the compressed image data. The metadata includes data on the relay source apparatus (for example, an IP address), data indicative of a second protocol used by the relay source apparatus to transfer the compressed image data to the image relay apparatus 300, image format data (for example, compression scheme data and pixel format data), display position data (for example, coordinate data), a data size, and an alias name. In the present embodiment, various protocols are assumed, and the compressed image data is not limited to screen data on a PC monitor or the like but may be based on moving image data, image data on the web (for example, a weather map), or the like. The metadata addition unit 314 outputs the compressed image data provided with the metadata to the determination unit 303.

The determination unit 303 receives the compressed image data from the metadata addition unit 314 and reads the protocol data from the protocol data storage unit 315. The determination unit 303 determines, based on the protocol data, whether or not the compressed image data can be processed through a first path not involving decompression of the compressed image data. Here, the first path refers to a processing path to the transmission unit 310 via the conversion unit 111 and the web page creation unit 316. On the first path, the compressed image data is not changed. In contrast, a second path refers to a processing path to the transmission unit 310 via the decompression unit 104, the drawing unit 105, the frame buffer 106, the compression unit 109, and the web page creation unit 316. On the second path, the compressed image data is changed, and the changed data is output as recompressed image data. The determination unit 303 outputs the compressed image data to the conversion unit 111 upon determining that the compressed image data can be processed through the first path. Otherwise the determination unit 303 outputs the compressed image data to the decompression unit 104.

In other words, the determination unit 303 determines whether or not the compressed image data needs to be changed, based on the protocol data. If the compressed image data needs to be changed, since the compressed image data cannot be processed through the first path, the second path should be used to process the compressed image data. In contrast, if the compressed image data need not be changed, a useless processing load can be avoided by processing the compressed image data through the first path.

If the compressed image data cannot be transferred in accordance with the first protocol, the determination unit 303 determines that the compressed image data cannot be processed through the first path. For example, if the first protocol is the same as the second protocol (for example, both the first and second protocols are a screen transfer protocol or MPEG4), the compressed image data can basically be transferred in accordance with the first protocol. Furthermore, even if the first protocol is not the same as the second protocol (for example, the first protocol is a screen transfer protocol and the second protocol is HTTP), the compressed image data may possibly be transferred in accordance with the first protocol. In contrast, if the first protocol is not the same as the second protocol, the compressed image data may fail to be transferred in accordance with the first protocol. Specifically, the compressed image data cannot be transferred in accordance with the first protocol if for example, the compressed image data lacks a part of the data required in the first protocol or the compressed image data is different from an image format supported by the first protocol.

For example, if the first protocol is HTTP, which requires image data on the entire image, and the second protocol is a screen transfer protocol that does not necessarily transfer the image data on the entire image, the transfer of the compressed image data in accordance with the first protocol results in the shortage of data required for display on the relay destination apparatus. Hence, recompressed image data based on the image data on the entire image needs to be obtained through the second path. Furthermore, if the first protocol is a screen transfer protocol involving transfer of still image data and the second protocol is MPEG4, which involves transfer of moving image data, the first and second protocols support different image formats, precluding the compressed image data from being transferred in accordance with the first protocol. Thus, the image format of the compressed image data needs to be changed through the second path.

For example, as shown in FIG. 6, JPEG compressed image data based on image data A is transferred from a relay source apparatus 11 to the image relay apparatus 300 in accordance with HTTP. JPEG compressed image data based on image data B is transferred from a relay source apparatus 12 to the image relay apparatus 300 in accordance with a screen transfer protocol. Based on the protocol data, the image relay apparatus 300 determines that the compressed image data based on image data A can be processed through the first path and that the compressed image data based on image data B cannot be processed through the first path. Then, the image relay apparatus 300 transfers the JPEG compressed image data based on image data A and JPEG recompressed image data based on image data B to a relay destination apparatus 21 in accordance with HTTP.

If the second protocol is, for example, a screen transfer protocol, the image data processing unit 308 receives position data on an updated area from the update detection unit 107. The image data processing unit 308 reads the image data on the updated area from the frame buffer 106. In contrast, if the first protocol is HTTP, the image data processing unit 308 reads image data on the entire image from the frame buffer 106 regardless of the updated area. The image data processing unit 308 outputs the image data read from the frame buffer 106 to the compression unit 109.

If the first protocol is HTTP, the web page creation unit 316 creates a web page that allows the compressed image data or the recompressed image data to be transferred to the relay destination apparatus. The web page creation unit 316 outputs a generated web page and a uniform resource locator (URL) that allows access to the web page, to the transmission unit 310. Specifically, the web page creation unit 316 creates, for example, a web page shown in FIG. 5. The web page in FIG. 5 indicates that image data provided with an alias name PC_A.jpg is displayed at (20, 10) on the screen of the relay destination apparatus and that image data provided with an alias name weather.jpg is displayed at (400, 200) on the screen of the relay destination apparatus. In the example illustrated in FIG. 5, weather.jpg is displayed above PC_A.jpg.

If the first protocol is HTTP, the transmission unit 310 receives the web page and URL from the web page creation unit 316 and transmits URL to the relay destination apparatus. Then, the transmission unit 310 transfers the web page to the relay destination apparatus in response to a request from the relay destination apparatus (for example, an HTTP GET request).

As described above, the image relay apparatus according to the third embodiment determines whether or not the compressed image data from the relay source apparatus needs to be changed (for example, if the compressed image data corresponds to a part of the image, the remaining part of the image is added to the compressed image data, or if the compressed image data is moving image data, the compressed image data is changed into still image data), based on the protocol data, a type of data on the relay destination apparatus. If the compressed image data needs to be changed, the image relay apparatus uses the second path to carry out the series of processes including decompression, drawing, and recompression. Otherwise the image relay apparatus utilizes the first path to omit the series of processes. Thus, the image relay apparatus enables a reduction in processing load.

Fourth Embodiment

Figure 7:
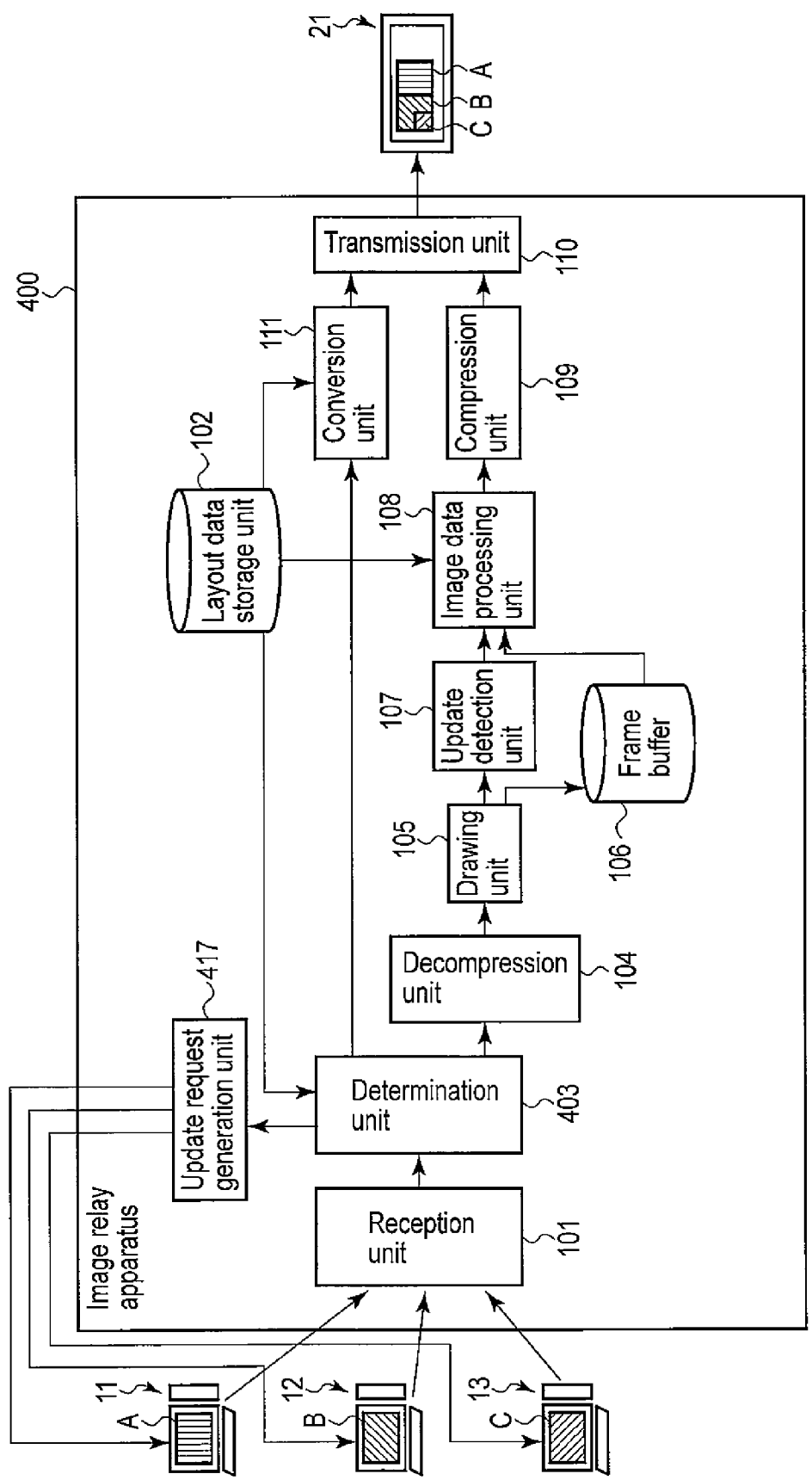
FIG. 7 is a block diagram illustrating an image relay apparatus according to a fourth embodiment.

As shown in FIG. 7, an image relay apparatus 400 according to a fourth embodiment includes a reception unit 101, a layout data storage unit 102, a determination unit 403, a decompression unit 104, a drawing unit 105, a frame buffer 106, an update detection unit 107, an image data processing unit 108, a compression unit 109, a transmission unit 110, a compression unit 111, and an update request generation unit 417.

The determination unit 403 receives the compressed image data from the reception unit 101 and reads layout data from the layout data storage unit 102. The determination unit 403 determines, based on the layout data, whether or not the compressed image data can be processed through a first path. Here, the first path refers to a processing path to the transmission unit 110 via the conversion unit 111. On the first path, the compressed image data is not changed. In contrast, a second path refers to a processing path to the transmission unit 110 via the decompression unit 104, the drawing unit 105, the frame buffer 106, the update detection unit 107, the image data processing unit 108, and the compression unit 109. On the second path, the compressed image data is changed, and the changed data is output as recompressed image data.

The determination unit 403 outputs the compressed image data to the conversion unit 111 upon determining that the compressed image data can be processed through the first path. In contrast, upon determining that the compressed image data cannot be processed through the first path, the determination unit 403 determines whether or not the relay source apparatus can be requested to carry out preprocessing described below. Upon determining that the relay source apparatus can be requested to carry out the preprocessing, the determination unit 403 instructs the update request generation unit 417 to generate an update request message. Upon determining that the relay source apparatus cannot be requested to carry out the preprocessing, the determination unit 403 outputs the compressed image data to the decompression unit 104.

In other words, the determination unit 403 determines whether or not the compressed image data needs to be changed, based on the layout data. If the compressed image data need not be changed, a useless processing load can be avoided by processing the compressed image data through the first path. Furthermore, even if the compressed image data needs to be changed, the change may be replaced with the preprocessing carried out by the relay source apparatus. Thus, the determination unit 403 determines whether or not the relay source apparatus can be requested to carry out the preprocessing for transferring compressed image data that need not be changed. The preprocessing eliminates the need to change the compressed image data, thus allowing the compressed image data to be processed through the first path. In contrast, without the preprocessing, the compressed image data cannot be processed through the first path and should thus be processed through the second path.

In accordance with an instruction from the determination unit 403, the update request generation unit 417 generates and transmits an update request message for the preprocessing to the relay source apparatus.

Figure 8:
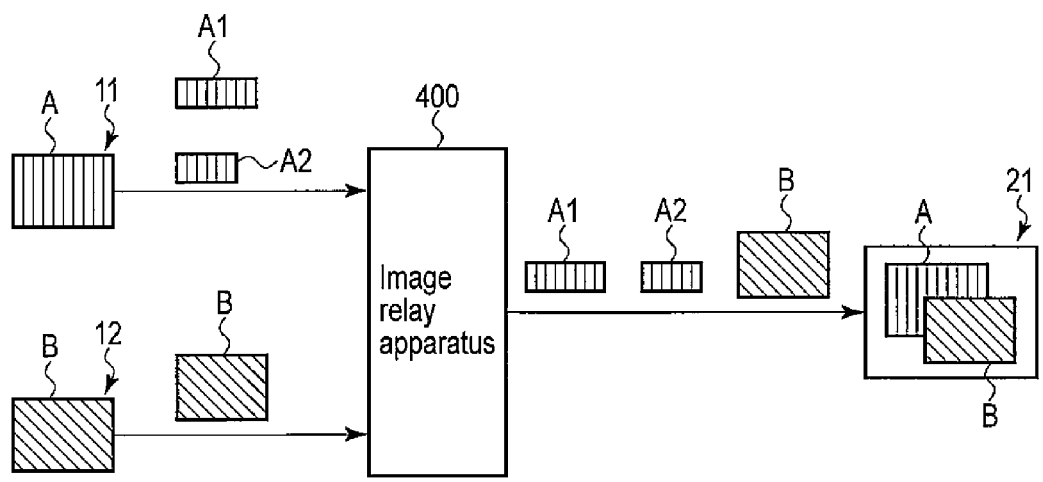
FIG. 8 is a diagram illustrating image data relayed by the image relay apparatus according to the fourth embodiment.

For example, it is assumed that image data A is clipped and displayed on the relay destination apparatus 21 and that image data B is displayed on the relay destination apparatus 21 without being clipped, as shown in FIG. 8. The compressed image data based on image data B can be processed through the first path, whereas the compressed image data based on image data A cannot be processed through the first path. Thus, the determination unit 403 instructs the update request generation unit 417 to generate an update request message for the relay source apparatus. The update request generation unit 417 generates and transmits an update request message to the relay source apparatus 11 so that the relay source apparatus 11 divides image data A into image data A1 and image data A2 and transfers image data A1 and image data A2. As a result, the relay source apparatus 11 transfers, for example, compressed image data based on image data A1 and image data A2 into which image data A has been divided. Hence, the image relay apparatus 400 can process the compressed image data through the first path. The image data may be divided into one or more rectangular areas by extending some or all of the boundary lines of the area to be clipped as illustrated in FIG. 8 or in another manner.

Figure 9:
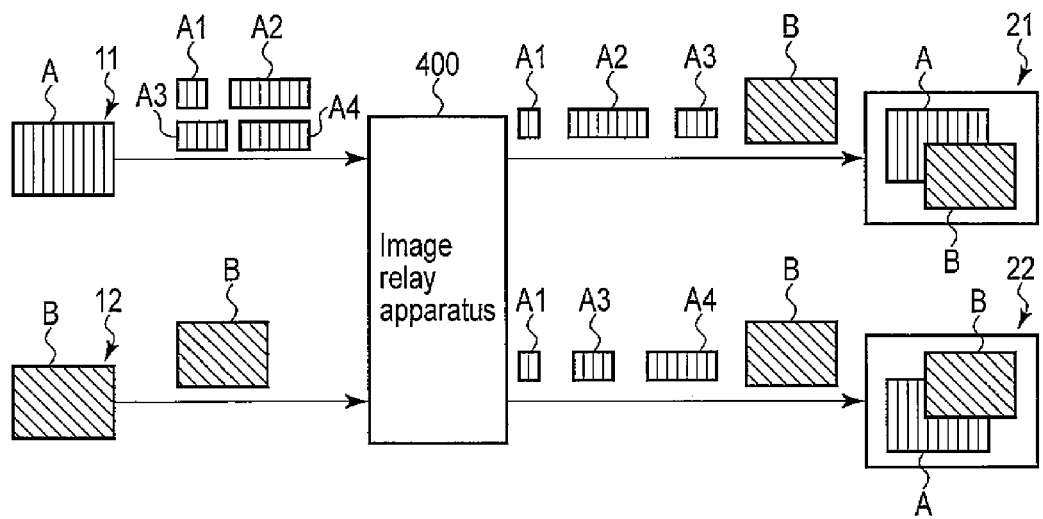
FIG. 9 is a diagram illustrating image data relayed by the image relay apparatus according to the fourth embodiment.
Figure 10:
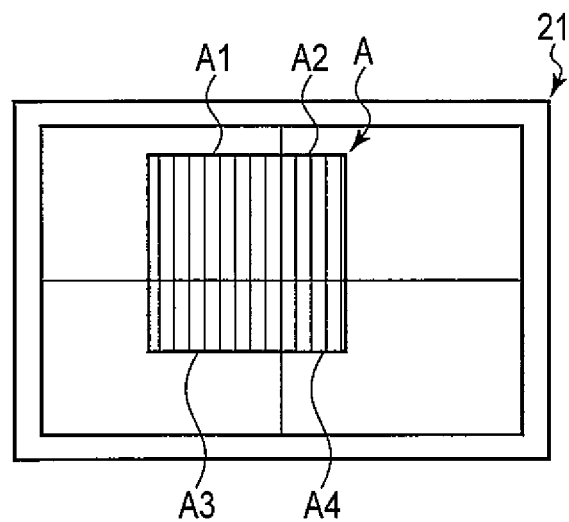
FIG. 10 is a diagram illustrating image data relayed by the image relay apparatus according to the fourth embodiment.

Furthermore, if the common image data A is transferred to a plurality of relay destination apparatuses 21 and 22 as illustrated in FIG. 9, an update request message is generated based on the layout data on all the relay destination apparatuses 21 and 22. For example, if image data A is to be transferred only to the relay destination apparatus 21, image data A1 and image data A2 need not be separated from each other. However, if image data A is also transferred to the relay destination apparatus 22, image data A2 needs to be clipped. Furthermore, if image data A is to be transferred only to the relay destination apparatus 22, image data A3 and image data A4 need not be separated from each other. However, if image data A is also transferred to the relay destination apparatus 21, image data A4 needs to be clipped. Thus, to allow image data A to be transferred to the relay destination apparatuses 21 and 22, an update request image is generated such that the relay source apparatus 11 divides image data A into image data A1, image data A2, image data A3, and image data A4 and transfers these pieces of image data.

Furthermore, if the relay destination apparatus 21 includes a multi-display and image data A is displayed across a plurality of (for example, four) screens, an update request message is generated so that the relay destination apparatus 21 divides image data A along the boundaries of screens of the relay destination apparatus 21 into data A1, image data A2, image data A3, and image data A4 and transfers these pieces of image data.

Figure 11:
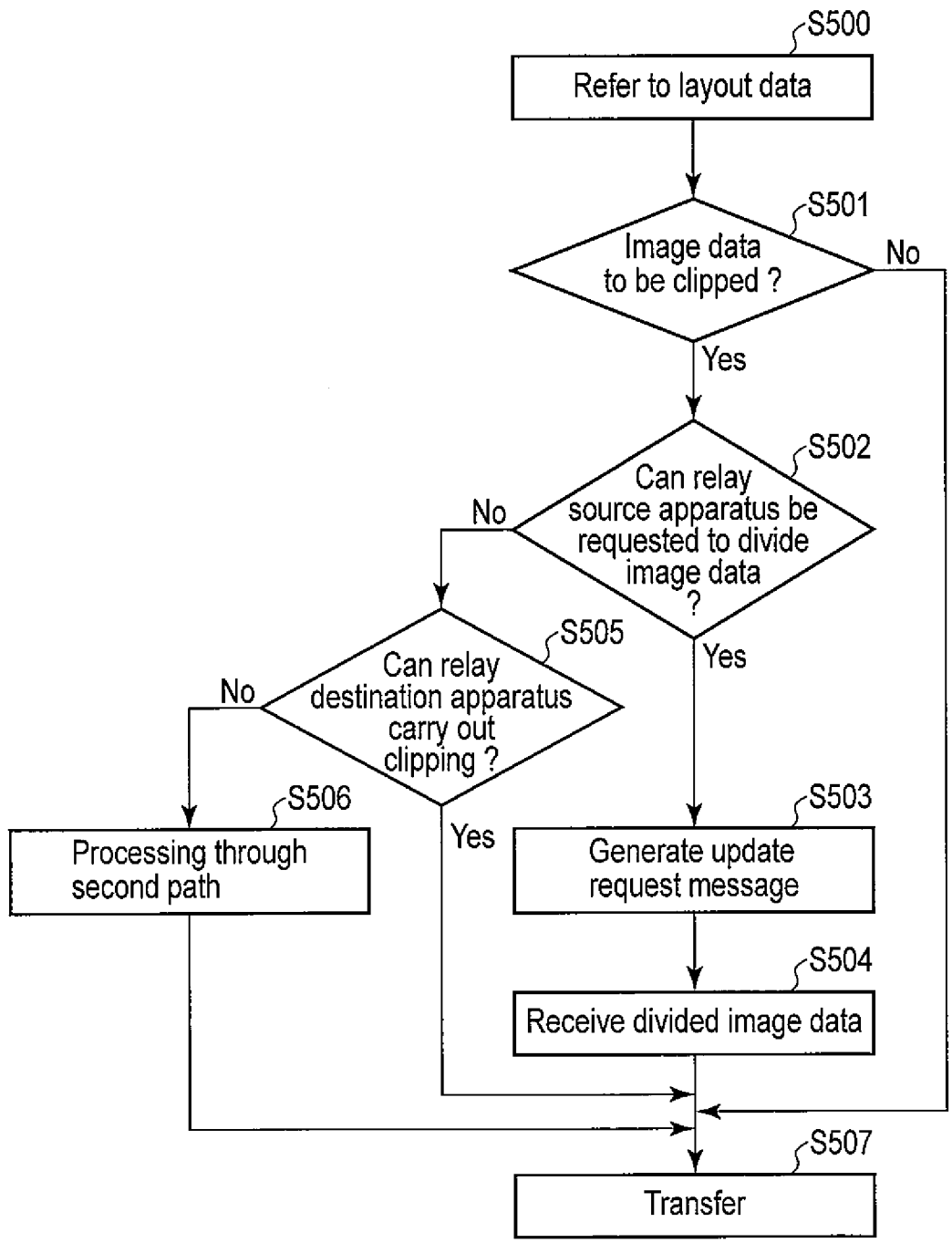
FIG. 11 is a flowchart illustrating an operation of the image relay apparatus according to the fourth embodiment.

The image relay apparatus 400 operates, for example, in accordance with a flowchart in FIG. 11.

First, the determination unit 403 references the layout data on the relay destination apparatus (step S500). The determination unit 403 determines whether or not the image data is to be clipped for the relay destination apparatus, based on the layout data (step S501). If the image data is not to be clipped for the relay destination apparatus, the compressed image data based on the image data is processed through the first path, and the processed compressed image data is transferred (step S507). In contrast, if the image data is to be clipped for the relay destination apparatus, the processing proceeds to step S502. In step S502, the determination unit 403 determines whether or not the relay source apparatus can be requested to divide the image data. If the relay source apparatus can be requested to divide the image data, the processing proceeds to step S503. Otherwise (if for example, the relay source apparatus cannot divide the image data) the processing proceeds to step S505.

In step S503, the update request generation unit 417 generates an update request message so as to allow the relay source apparatus to divide the image data. The update request message is transmitted to the relay source apparatus. In response to the update request message, the compressed image data based on the divided image data is transferred by the relay source apparatus and received by the reception unit 101 (step S504). The divided image data need not be clipped. Thus, the compressed image data based on the divided image data is processed through the first path, and the processed compressed image data is transferred (step S507).

In step S505, the determination unit 403 determines whether or not the relay destination apparatus can clip the image data. If the relay destination apparatus can clip the image data, the image relay apparatus 400 need not clip the image data. Thus, the compressed image data based on the image data is processed through the first path, and the processed compressed image data is transferred (step S507). In contrast, if the relay destination apparatus cannot clip the image data, the image relay apparatus 400 needs to clip the image data. Thus, the compressed image data is processed through a second path (step S506), and recompressed image data is transferred (step S507).

The determination unit 403 may utilize not only the layout data but also the above-described display capability data and image format data.

For example, it is assumed that the only compression scheme supported by the relay destination apparatus is zlib and that a default compression scheme for image data is hextile. In such a case, the compressed image data based on the image data cannot be processed through the first path. Thus, the determination unit 403 instructs the update request generation unit 417 to generate an update request message. The update request generation unit 417 generates and transmits an update request message to the relay source apparatus so as to allow the relay source apparatus to select zlib as a compression scheme for image data. As a result, the relay destination apparatus transfers, for example, compressed image data obtained by compressing the image data in accordance with zlib. Therefore, the image relay apparatus 400 can process the compressed image data through the first path.

Figure 12:
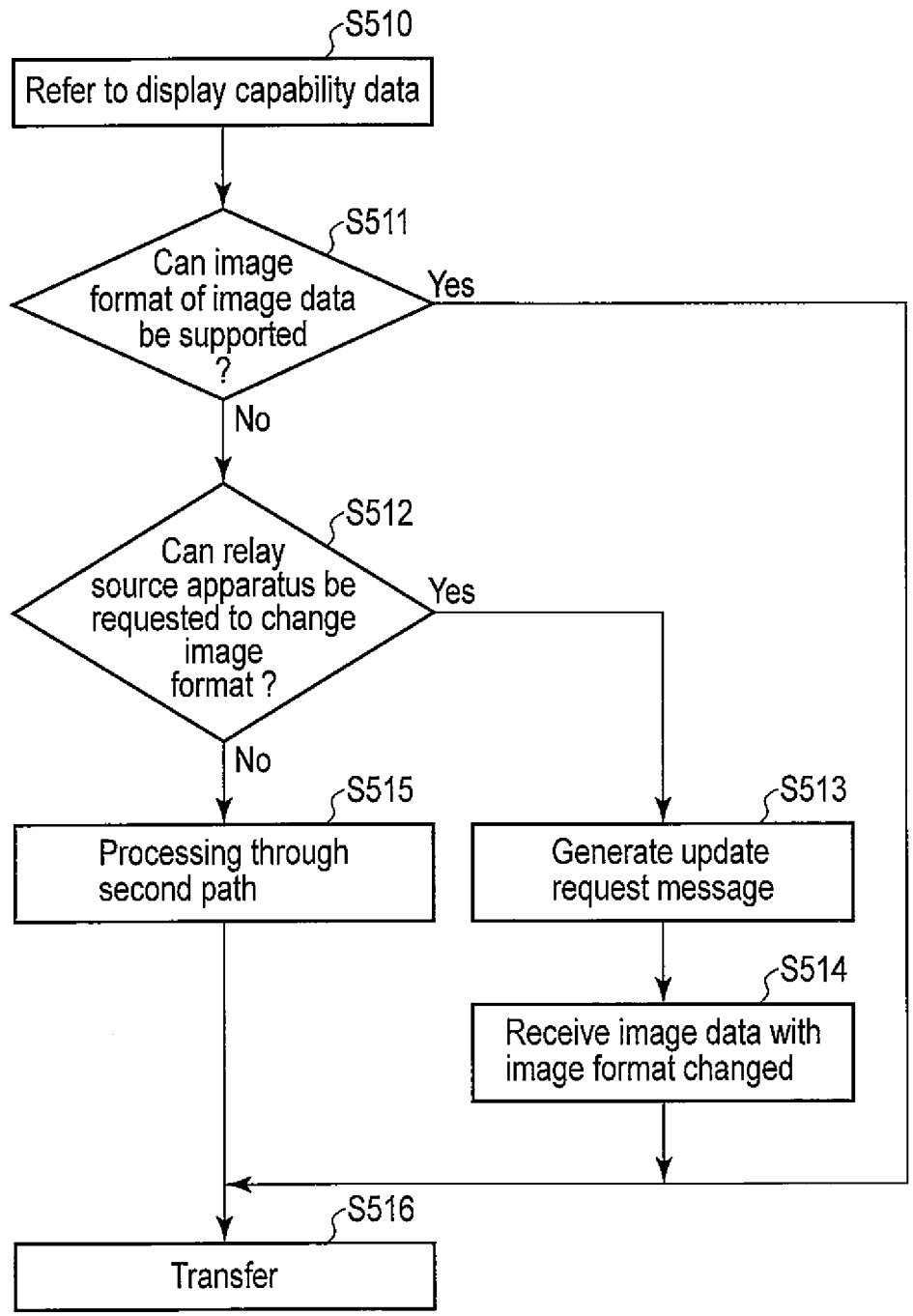
FIG. 12 is a flowchart illustrating an operation of the image relay apparatus according to the fourth embodiment.

If the determination unit 403 utilizes the display capability data and the image format data, the image relay apparatus 400 operates, for example, in accordance with a flowchart in FIG. 12.

First, the determination unit 403 references the display capability data on the relay destination apparatus (step S510). The determination unit 403 determines whether or not the relay destination apparatus can support the image format of the image data (step S511). If the relay destination apparatus can support the image format of the image data, the compressed image data based on the image data is processed through the first path, and the processed compressed image data is transferred (step S516). In contrast, if the relay destination apparatus cannot support the image format of the image data, the processing proceeds to step S512. In step S512, the determination unit 403 determines whether or not the relay source apparatus can be requested to change the image format of the image data. If the relay source apparatus can be requested to change the image format of the image data, the processing proceeds to step S513. In contrast, if the relay source apparatus cannot be requested to change the image format of the image data, the image relay apparatus 400 needs to change of the image format of the image data. Thus, the compressed image data based on the image data is processed through the second path (step S515). Then, recompressed image data is transferred (step S516).

In step S513, the update request generation unit 417 generates an update request message so as to allow the relay source apparatus to change the image format of the image data. The update request message is transmitted to the relay source apparatus. In response to the update request message, the compressed image data based on the image data with the image format changed is transferred by the relay source apparatus and received by the reception unit 101 (step S514). The relay destination apparatus can support the image format of the received compressed image data. Thus, the compressed image data is processed through the first path, and the processed compressed image data is transferred (step S516).

The determination unit 403 may utilize not only the layout data, the display capability data, and the image format data but also the above-described protocol data.

For example, it is assumed that the first protocol for the relay destination apparatus is HTTP and that the second protocol for the relay destination apparatus is a screen transfer protocol. In such a case, HTTP requires the image data corresponding to the entire image, whereas image data transferred in accordance with the screen transfer protocol does not necessarily correspond to the entire image. Hence, the compressed image data based on the image data cannot be processed through the first path. Thus, the determination unit 403 instructs the update request generation unit 417 to generate an update request message for the relay source apparatus. The update request generation unit 417 transmits an update request message to the relay source apparatus so as to allow the relay source apparatus to transfer the compressed image data based on the image data corresponding to the entire image. As a result, the relay source apparatus transfers the compressed image data based on the image data corresponding to the entire image. Therefore, the image relay apparatus 400 can process the compressed image data through the first path.

Figure 13:
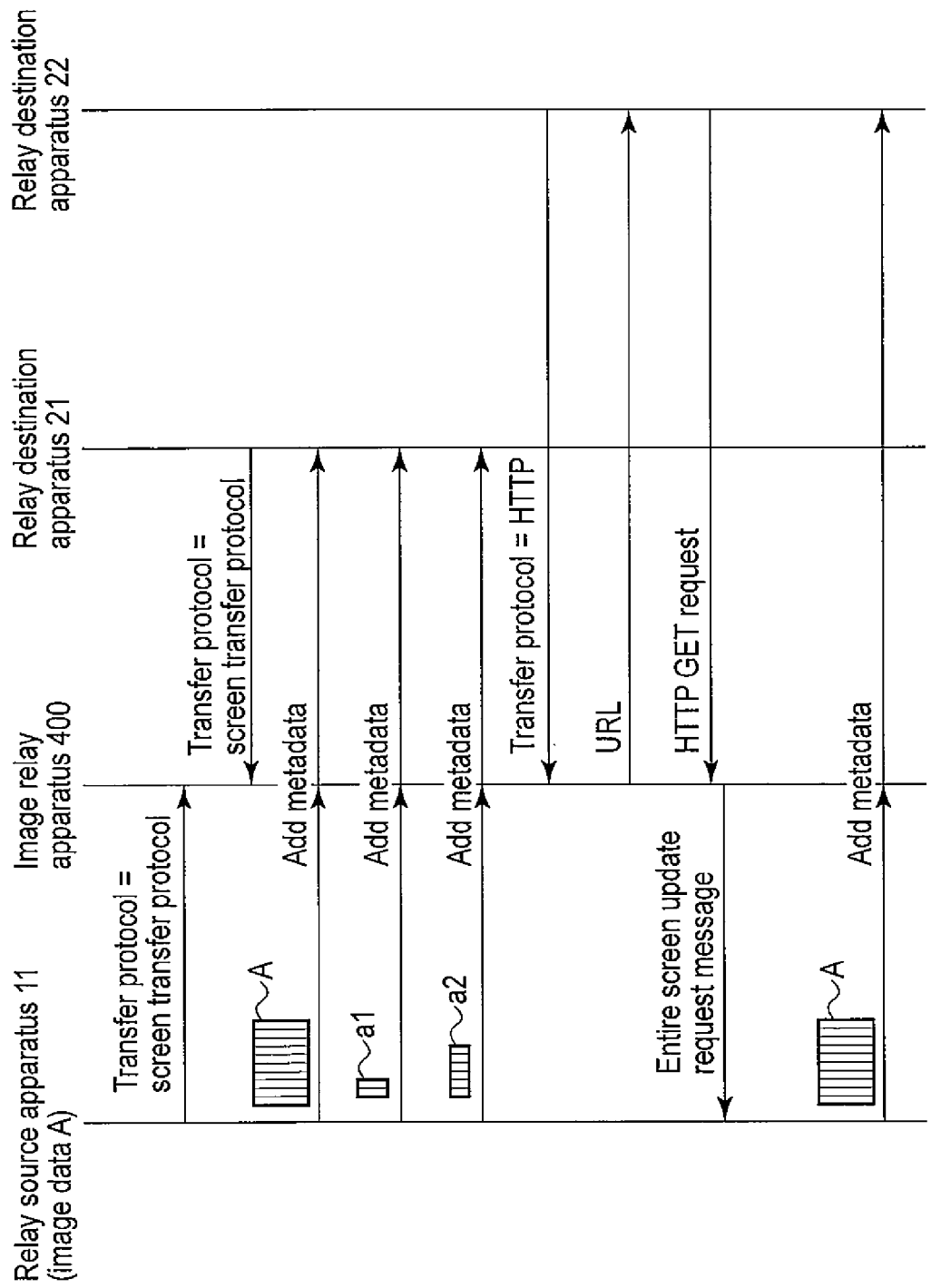
FIG. 13 is a sequence diagram illustrating an operation of the image relay apparatus according to the fourth embodiment.

It is assumed that the second protocol for the relay source apparatus 11 is a screen transfer protocol and that the first protocol for the relay destination apparatus 21 is also a screen transfer protocol, as illustrated in FIG. 13. In this case, the image relay apparatus 400 can process the compressed image data based on the image data (image data A on the entire image and image data a1 and image data a2 on an updated area) through the first path. In contrast, it is assumed that the second protocol for the relay source apparatus 11 is a screen transfer protocol and that the first protocol for the relay destination apparatus 22 is HTTP. In this case, the image relay apparatus 400 transmits an update request message to the relay source apparatus 11 so as to allow the relay source apparatus 11 to transfer the compressed image data based on the image data corresponding to the entire image. The image relay apparatus 400 receives the compressed image data based on image data A corresponding to the entire image. The image relay apparatus 400 then adds metadata (alias name) to the compressed image data to generate a web page. Furthermore, before or after the transmission of the update request message, the image relay apparatus 400 transmits URL to the relay destination apparatus 22. The image relay apparatus 400 transfers the web page with the compressed image data in response to an HTTP GET request from the relay destination apparatus 22.

Figure 14:
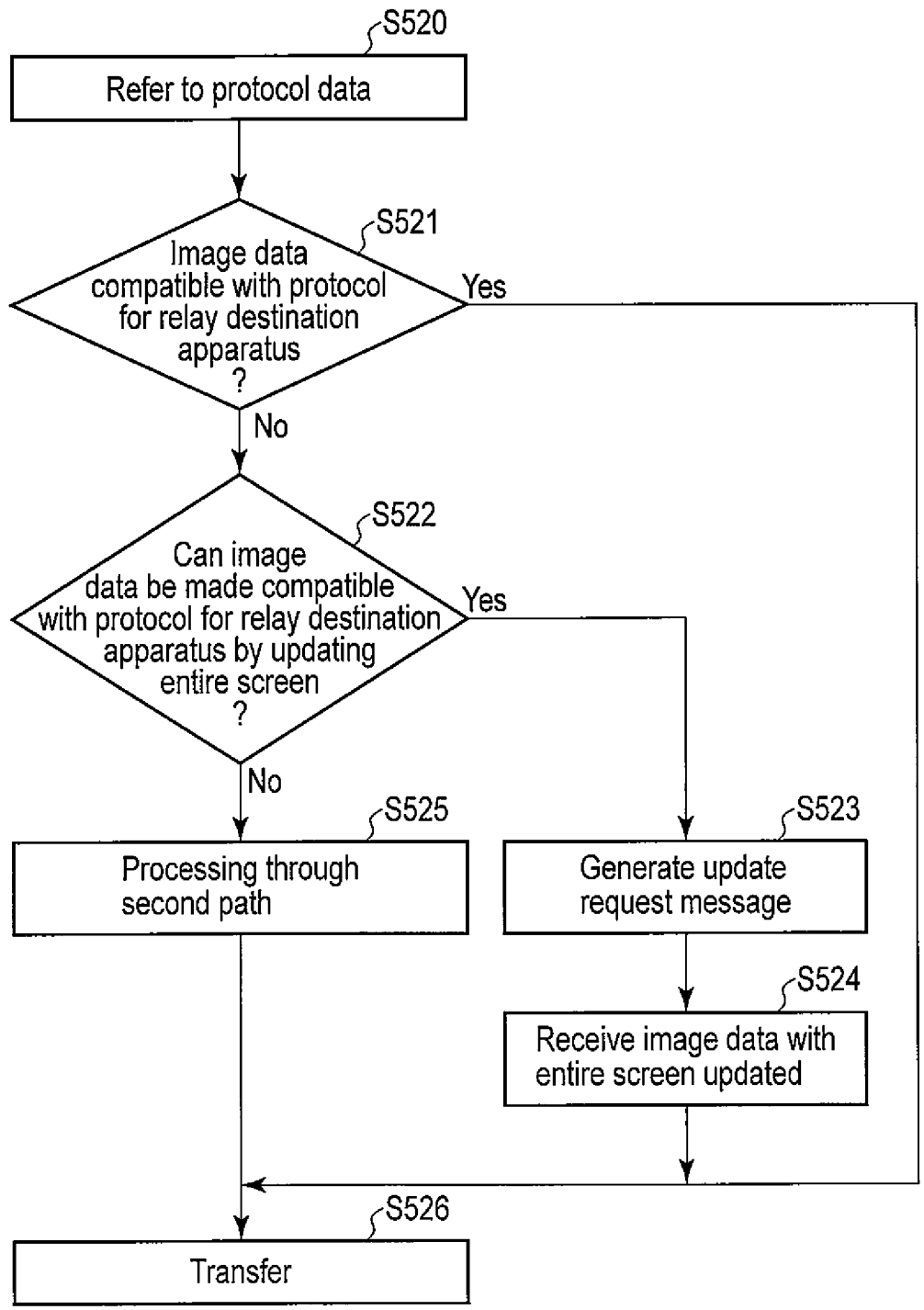
FIG. 14 is a flowchart illustrating an operation of the image relay apparatus according to the fourth embodiment.

If the determination unit 403 utilizes the protocol data, the image relay apparatus 400 operates, for example, in accordance with a flowchart in FIG. 14.

First, the determination unit 403 references the protocol data on the relay destination apparatus (step S520). The determination unit 403 determines whether or not the image data is compatible with the first protocol (step S521). For example, if the first protocol is HTTP, the determination unit 403 determines whether or not the image data corresponds to the entire image. If the image data is compatible with the first protocol, the compressed image data based on the image data is processed through the first path, and the processed compressed image data is transferred (step S526). In contrast, if the image data is not compatible with the first protocol, the determination unit 403 determines whether or not the image data can be made compatible with the first protocol by updating the entire screen. For example, if the first protocol is HTTP, the image data can be made compatible with the first protocol by updating the entire screen. If the image data can be made compatible with the first protocol by updating the entire screen, the processing proceeds to S523. In contrast, if the image data cannot be made compatible with the first protocol by updating the entire screen, the image relay apparatus 400 needs to change the image data so that the image data is compatible with the first protocol. Thus, the compressed image data based on the image data is processed through the second path (step S525). Recompressed image data is then transferred (step S526).

In step S523, the update request generation unit 417 generates an update request message so as to allow the relay source apparatus to update the entire image to change the image data. The update request message is transmitted to the relay source apparatus. In response to the update request message, the relay source apparatus updates the entire image to change the image data, and transfers the compressed image data based on the image data corresponding to the entire image. The reception unit 101 then receives the compressed image data (step S524). The compressed image data is compatible with the first protocol and is thus processed through the first path, and the processed compressed image data is transferred (step S526).

As described above, the image relay apparatus according to the fourth embodiment generates, based on the data on the relay destination apparatus, an update request message requesting the relay source apparatus to transfer compressed image data that need not be changed (that is, compressed image data that can be processed through the first path), and transmits the update request message to the relay source apparatus. Thus, the image relay apparatus can basically process the compressed image data through the first path, enabling a reduction in processing load.

In the present embodiment, the functional units for the second path can be removed provided that preprocessing can be reliably requested by, for example, properly designing the image relay apparatus 400, the relay source apparatus, and the relay destination apparatus.

Fifth Embodiment

Figure 15:
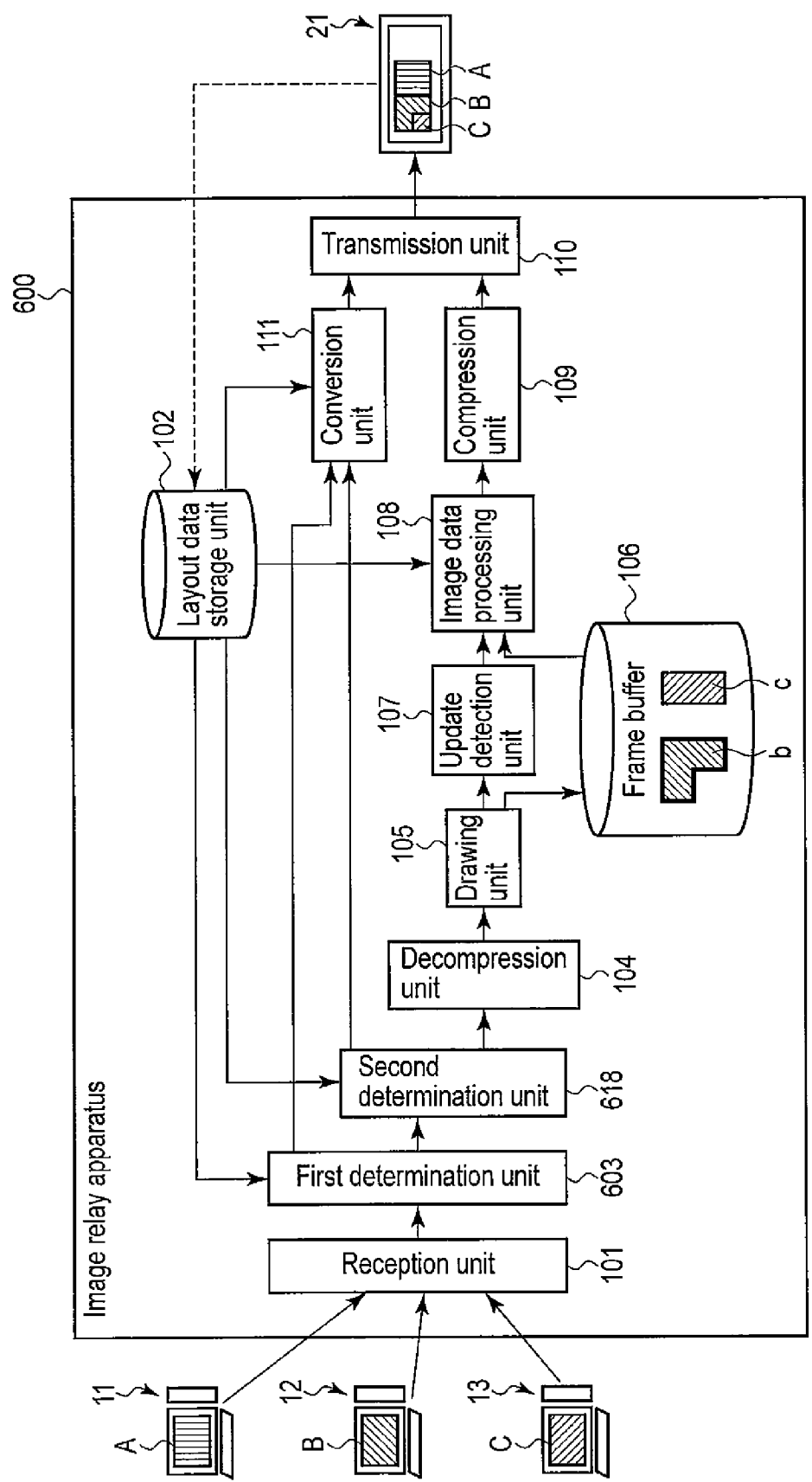
FIG. 15 is a block diagram illustrating an image relay apparatus according to a fifth embodiment.

As shown in FIG. 15, an image relay apparatus 600 according to a fifth embodiment includes a reception unit 101, a layout data storage unit 102, a first determination unit 603, a decompression unit 104, a drawing unit 105, a frame buffer 106, an update detection unit 107, an image data processing unit 108, a compression unit 109, a transmission unit 110, a compression unit 111, and a second determination unit 618.

The first determination unit 603 carries out a determination process that is identical or similar to that of the determination units 103, 203, 303, or 403. However, upon determining that the compressed image data cannot be processed through the first path, the first determination unit 603 outputs the compressed image data to the second determination unit 618 instead of the decompression unit 104.

The second determination unit 618 identifies an area to be clipped from the image data based on layout data. Then, based on display position data on the image data and the area to be clipped, the second determination unit 618 determines whether or not the compressed image data based on the image data can be discarded. Moreover, upon determining that the compressed image data cannot be discarded, the second determination unit 618 re-determines whether or not the compressed image data can be processed through the first path. Upon determining that the compressed image data can be processed through the first path, the second determination unit 618 outputs the compressed image data to the conversion unit 111. Otherwise the second determination unit 618 outputs the compressed image data to the decompression unit 104.

Figure 16:
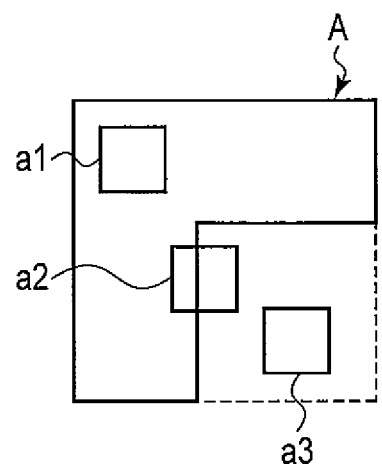
FIG. 16 is a diagram illustrating image data relayed by the image relay apparatus according to the fifth embodiment.

For example, it is assumed that the relay destination apparatus displays clipped image data A and the relay source apparatus transfers compressed image data based on image data a1, image data a2, and image data a3 on updated areas as shown in FIG. 16. If the relay destination apparatus displays none of image data a3 corresponding to the compressed image data, the second determination unit 618 determines that the compressed image data can be discarded, and discards the compressed image data. Furthermore, if the relay destination apparatus displays clipped image data a2 corresponding to the compressed image data, the second determination unit 618 determines that the compressed image data cannot be discarded and cannot be processed through the first path. The second determination unit 618 may determine that the compressed image data can be processed through the first path if the relay destination apparatus can clip image data a2. If the relay destination apparatus displays image data a1 corresponding to the compressed image data without clipping image data a1, the second determination unit 618 determines that the compressed image data cannot be discarded and can be processed through the first path. The second determination unit 618 may determine that image data a1 cannot be processed through the first path based on image format data, display capability data, protocol data, or the like. If for example, the relay destination apparatus fails to support the compression scheme for image data a1 or the first protocol for the relay destination apparatus is HTTP, the second determination unit 618 may determine that the compressed image data based on image data a1 cannot be processed through the first path.

As described above, the image relay apparatus according to the fifth embodiment identifies the area to be clipped from the image data in the relay destination apparatus based on the layout data, and based on the relationship between the display position data on the image data and the area to be clipped, determines whether or not the compressed image data based on the image data can be discarded. Thus, the image relay apparatus allows unwanted compressed image data to be discarded, enabling a reduction in processing load. Moreover, even upon determining that the compressed image data cannot be discarded, the image relay apparatus re-determines whether or not the compressed image data can be processed through the first path. Therefore, the image relay apparatus enables a reduction in processing load if the compressed image data cannot be discharged but can be processed through the first path.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image relay apparatus comprising:
   a reception unit configured to receive compressed image data from a relay source apparatus;
   a first determination unit configured to determine whether or not the compressed image data is processable through a first path not involving decompression of the compressed image data, based on data on a relay destination apparatus; and
   a transmission unit configured to transfer, to the relay destination apparatus, either the compressed image data processed through the first path or recompressed image data obtained by processing the compressed image data through a second path involving decompression, drawing, and recompression of the compressed image data.

2. The apparatus according to claim 1, wherein the data on the relay destination apparatus includes data indicative of a layout, in the relay destination apparatus, of image data corresponding to the compressed image data.

3. The apparatus according to claim 1, wherein the data on the relay destination apparatus includes data indicative of a display capability of the relay destination apparatus, and
   the first determination unit determines whether or not the compressed image data is processable through the first path, based on the data on the relay destination apparatus and data indicative of an image format of the compressed image data.

4. The apparatus according to claim 1, wherein the data on the relay destination apparatus includes data indicative of a protocol that is used to transfer either the compressed image data or the recompressed image data to the relay destination apparatus, and the first determination unit determines that the compressed image data is processable through the first path if the compressed image data is transferrable in accordance with the protocol.

5. The apparatus according to claim 1, further comprising an update request unit configured to generate and transmit an update request message to the relay source apparatus so as to allow the relay source apparatus to transfer compressed image data that is processable though the first path if the first determination unit determines that the compressed image data is not processable through the first path.

6. The apparatus according to claim 1, further comprising a second determination unit configured to determine that the compressed image data is discardable and discard the compressed image data if entire image data corresponding to the compressed image data is included in an area to be clipped for the relay destination apparatus.

7. An image relay method comprising:
  receiving compressed image data from a relay source apparatus;
  determining whether or not the compressed image data is processable through a first path not involving decompression of the compressed image data, based on data on a relay destination apparatus; and
  transferring, to the relay destination apparatus, either the compressed image data processed through the first path or recompressed image data obtained by processing the compressed image data through a second path involving decompression, drawing, and recompression of the compressed image data.

8. A non-transitory computer readable storage medium storing instructions of a computer program which when executed by a computer results in performance of steps comprising:
  receiving compressed image data from a relay source apparatus;
  determining whether or not the compressed image data is processable through a first path not involving decompression of the compressed image data, based on data on a relay destination apparatus; and
  transferring, to the relay destination apparatus, either the compressed image data processed through the first path or recompressed image data obtained by processing the compressed image data through a second path involving decompression, drawing, and recompression of the compressed image data.

* * * * *